United States Patent [19]

Gray

[11] 4,181,516

[45] Jan. 1, 1980

[54] PRODUCTS FOR CORRECTING IRON CHLOROSIS IN PLANTS

[76] Inventor: Kenneth R. Gray, Box 205, Shelton, Wash. 98584

[21] Appl. No.: 817,364

[22] Filed: Aug. 22, 1977

[51] Int. Cl.$^2$ ................................................ C09F 7/00
[52] U.S. Cl. .................................. 71/25; 71/DIG. 2; 71/23
[58] Field of Search ...................... 71/25, DIG. 2, 23; 260/939 R

[56] References Cited

U.S. PATENT DOCUMENTS

| | | | |
|---|---|---|---|
| 1,976,905 | 10/1934 | Thordarson | 71/25 |
| 2,663,628 | 12/1953 | Thomsen | 71/25 |
| 2,929,700 | 3/1960 | Bennett | 71/1 |
| 2,943,100 | 6/1960 | Holstein | 71/DIG. 2 |
| 3,131,048 | 4/1964 | Balassa | 71/DIG. 2 |
| 3,387,965 | 6/1968 | Kiyooka et al. | 71/25 |
| 3,652,385 | 3/1972 | Noreus et al. | 162/76 |

OTHER PUBLICATIONS

*Pulpind Processes,* Rydholm, Interscience Publishers, NY, 1965, p. 389.

*Primary Examiner*—Joseph Scovronek
*Assistant Examiner*—C. Konkol

[57] ABSTRACT

New products are provided for the correction of iron chlorosis in plants. The products are iron chelates prepared by adding ferric iron salts to concentrated solutions of hot caustic effluents from bleach plants of wood pulp mills. The dried chelate is added to the soil in which the plants are growing or to the soil in which plants are to be grown.

1 Claim, No Drawings

PRODUCTS FOR CORRECTING IRON CHLOROSIS IN PLANTS

This invention relates to new and improved anti-chlorosis products. More particularly, it relates to new and more economical products for correcting iron chlorosis in plants.

Iron deficiency (usually termed chlorosis) is generally caused by lack of available iron in the soils. Small quantities of iron are essential for all growing plants for the production of chlorophyll in the leaves in order that photosynthesis may proceed. Chlorotic plants can usually be recognized by yellow coloration in the leaves.

In general, the soils in which growing plants become chlorotic do not suffer from an actual deficiency of iron. The problem is that the iron is present in form unavailable to plants. In limited areas, namely areas of Florida with acid, sandy soils an excess of copper in the soil inhibits take up of sufficient iron by citrus trees. In such areas chlorosis can be controlled by addition to the soil of small amounts of the relatively inexpensive ferric chelate of sodium EDTA. In far greater areas in the western United States and around the world, crops become chlorotic because soils are calcareous. Such calcareous soils are alkaline due to the presence of calcium carbonate. In such calcareous soils any iron present is converted to ferric oxide which has such high stability that it cannot be taken up by plants. Even addition of ferric EDTA is not effective in calcareous soils for control of chlorosis. This is because ferric EDTA is not sufficiently stable in alkaline soils to prevent the iron in it from becoming converted into very insoluable ferric hydroxide. Only one very costly iron chelate, namely, the ferric chelate ethylenediamine—N,N bis (2-hydroxyphenylacetic) is known to be effective for control of chlorosis in calcareous soils. The product is so expensive that it is used only to a limited extent in calcareous soil with very high value crops such as citrus.

Hot caustic effluent, from bleach plants in pulp from manufacture of high-alpha or dissolving pulps, consists largely of crude sodium salts of isosaccharinic acid and related hydroxy acids and also some sodium formate and some sodium acetate and in dispersion some unsulfonated lignin. Probably because of the high content of sodium isosaccharinate, I find that ferric salts, especially ferric sulfate, form very stable ferric chelates.

With certain crops, in some areas, chlorosis can be controlled by foliar sprays of the plants using relatively low cost materials such as iron complexes of lignosulfonates or sulfonated tannins. For the vast majority of crops growing on calcareous soils foliar spraying is not considered feasible. This is because spray equipment is not generally available except with orchards and because with many crops farmers fear spraying the growing crops with iron sprays in view of the possibility of staining or otherwise damaging the crops.

Thus the vast majority of chlorotic crops growing on calcareous soil receives no form of correction to control iron deficiency. This lack of correction results in substandard crop yields and in some cases poorer quality. What is nedded is a low cost, very stable iron chelate that can be added to calcareous farm soils that will prevent plants planted or growing therein from becoming chlorotic.

An object of the invention is to provide new and improved, and low cost iron chelates to be applied to calcareous soils.

Another object is to provide useful, saleable chemicals from the hot caustic effluents of bleach plants during the manufacture of sulfite pulp. Presently the disposal of such effluents involves extensive costs without any economic return.

Hot caustic effluents from bleach plants in pulp mills are relatively dilute. If simply discarded to receiving waters they would nevertheless add considerable BOD loadings, e.g. 20-30 lbs. BOD per ton pulp in the case of paper pulps, and around 200 iron. BOD per ton pulp in the case of high alpha pulps. To avoid introduction to receiving waters of such BOD, the organic material in the effluent must be destroyed which is expensive because of the large volume and dilute nature.

I have found that ferric sulfate forms a very stabel complex with sodium isosaccharinate so that the complex can be added to calcareous soil without being converted to inactive ferric oxide. Furthermore, it is not necessary to use the pure complex and that the crude complex of ferric sulfate and hot caustic effluent is suitable for addition to calcareous soil so that plants can grow therein with minimized or no chlorosis.

In practicing the invention the very dilute (less than 10%) hot caustic effluent is evaporated to a solution of about 40%. Ferric sulfate, preferably in solution, is added to the concentrated hot caustic effluent in amount to give between 5 and 11% iron (as metallic) on a total solids basis. The addition of ferrous salts is useless since ferrous salts form very weak complexes of almost negligible strength with hydroxy acids. The addition of the ferric iron will cause coagulation of unsulfonated lignin in the hot caustic extract. This will not be harmful but the heated mixture should be spray dried as soon as possible.

The products of the invention will generally be worked into the top layers of the soil, on a metallic iron basis of from 2-16 lbs. per acre.

I claim:

1. A method for treating of soils to minimize chlorosis of plants growing therein comprising treating said soil with a ferric complex wherein the complex is obtained from the combination of a ferric salt and the crude caustic effluent of a bleach plant in pulp manufacture.

* * * * *